(12) United States Patent
Amer

(10) Patent No.: US 6,728,744 B2
(45) Date of Patent: Apr. 27, 2004

(54) WIDE WORD MULTIPLIER USING BOOTH ENCODING

(75) Inventor: Maher Amer, Ottawa (CA)

(73) Assignee: Mosaid Technologies Incorporated, Kanata (CA)

( * ) Notice: Subject to any disclaimer, the term of this patent is extended or adjusted under 35 U.S.C. 154(b) by 597 days.

(21) Appl. No.: 09/751,399

(22) Filed: Jan. 2, 2001

(65) Prior Publication Data

US 2002/0040379 A1 Apr. 4, 2002

(30) Foreign Application Priority Data

Dec. 30, 1999 (CA) .............................................. 2294554

(51) Int. Cl.[7] ................................................. G06F 7/52
(52) U.S. Cl. ....................................... 708/625; 708/627
(58) Field of Search ................................. 708/501, 503, 708/523, 603, 620, 625–632

(56) References Cited

U.S. PATENT DOCUMENTS

| | | | | |
|---|---|---|---|---|
| 4,228,520 A | * | 10/1980 | Letteney et al. | ............ 708/629 |
| 5,675,527 A | * | 10/1997 | Yano | ........................... 708/628 |
| 5,724,280 A | | 3/1998 | Davis | |
| 5,944,776 A | | 8/1999 | Zhang et al. | |
| 5,957,999 A | * | 9/1999 | Davis | ......................... 708/606 |

* cited by examiner

Primary Examiner—Chuong Dinh Ngo
(74) Attorney, Agent, or Firm—Kevin Pillay; Ogilvy Renault

(57) ABSTRACT

A multiplier for computing a final product of a first operand and a second operand comprising a multiplier array for forming a product of the first operand and second operand in carry-save form; a carry-save adder for adding said carry-save partial products and an accumulatd sum to produce a carry and save values; a carry-lookahead adder for adding said carry and save values to produce a product value and a carry-out value; a general purpose adder for adding said carry-out and said product value to produce said final product.

1 Claim, 11 Drawing Sheets

```
1111 1110 0000 0000      0P0
0000 0010 0000 0011      0P1
1111 0000 0000 0011      Sum0
     1
0000 0000 0000 0000      1P0
0000 0000 0000 0000      1P1
0000 1111 0000 0000      Sum
0000 0000 0000 0000      Carry
0000 0000 0000 0000      Sum1
   1
000①  0000 0000 0000 0011   final product
    error
```

Figure 7(A)

```
1111 1111 1110 0000 0000   0P0
0000 0000 0010 0000 0011   0P1
0000 0000 0000 0000 0000   1P0
0000 0000 0000 0000 0000   1P1
0000 0000 0000 0000 0011   final product
1       Fake carry out
```

| Data | Input from a Booth encoder and intermediate results during processing in an iterative adder | Comment |
|---|---|---|
| 0000 1111 1110 0000 0000 | 0P0(positive) | |
| 0000 0000 0001 0000 0011 | 0P1(positive) | |
| (0000) 0000 1111 1111 0000 0011 | SUM0 | No carry(CS) occurred |
| 0000 0000 0000 0000 0000 | 1P0(positive) | |
| 0000 0000 0000 0000 0000 | 1P1(positive) | |
| (0000) 0000 0000 1111 1111 0000 | SUM1 | |
| 0000 0000 1111 1111 0000 0011 | Intermediate Result acquired by applying invention until 2 stages among total of 8 stages | |

Figure 10(a)

| Data | Input from a Booth encoder and intermediate results during processing in an iterative adder | Comment |
|---|---|---|
| 1111 1111 1110 0000 0000 0000 | 0P0(negative) | |
| 0000 0000 0010 0000 0000 0011 | 0P1(positive) | |
| (0000) 0000 0000 0000 0000 0000 0011 | SUM0 | Carry(CS) occurred |
| 0000 0000 0000 0000 0000 0000 | 1P0(positive) | |
| 0000 0000 0000 0000 0000 0000 | 1P1(positive) | |
| (0000) 0000 0000 0000 0000 0000 0000 | SUM1 | |
| 0000 0000 0000 0000 0000 0011 | Intermediate Result acquired by applying invention until 2 stages among total of 8 stages | |

Figure 10(b)

WIDE WORD MULTIPLIER USING BOOTH ENCODING

The present invention relates to the field of arithmetic processors and more particularly to a method and circuit for multiplying large numbers using a booth encoder with iterative addition.

BACKGROUND OF THE INVENTION

As is well known multiplication of two numbers can be performed by a series of repeated additions, where the number to be added is the multiplicand and the number of times that it is added is the multiplier, the result is the product. Each step in the series of repeated additions generates a partial product. As it may be well appreciated, this process may be extremely slow when performed in a general-purpose processor, taking many clock cycles. In general terms multiplication of an M-bit number by an N-bit number will result in a product which is M+N bits long.

The increased need for high speed processing of large numbers has been precipitated by, for example, various cryptographic applications that use large numbers as encryption keys. These keys are at least 1024-bits long. Accordingly, multiplication using the repeated addition method that is suggested by the arithmetic definition above is often replaced by more efficient algorithms that make use of positional number representation. In general, the execution speed of an arithmetic operation is a function of two factors. One is a circuit technology and the other is the algorithm used.

The multiplication operation may be thought of as having two parts. The first part is dedicated to the generation of partial products and the second one collects and sums the partial products to obtain the final result. The booth algorithm is often used in the generation part because it reduces the number of partial products. The collection of the partial products can then be made using a regular array, a Wallace tree or a binary tree.

For an N-bit multiplier, no more than N/2 partial products are created. However, when the partial products from one multiplier operation are first added, the result is initially in a redundant format, such as carry-sum. That it, the result takes the form of two rows of binary information, a carry row and a sum row. But before this result may be used again, it must first be processed by an adder to put it into binary format. In other words, the carry row and the sum row must be added first. As mentioned earlier a Wallace tree compression unit also known in the art may be used to take the partial products and using rows of carry-save adders compress the partial products into two rows, a sum row and a carry row. A conventional N-bit full adder may then be used to add the sum row and the carry row.

However this full adder is slow since a carry generated in the low order bits may ripple all the way through to the high order bits. Thus the high order must wait for the carry to ripple through all N-bits. This problem is exacerbated when large width operands are used. Alternatively, carry look-ahead and carry select adders may be used to avoid large propagation delays, but are still slow. The complexity of such adder circuits is directly related to the width of the adder. A 32-bit adder is reasonable to implement using most technologies. A 64-bit adder is extremely large, extremely slow or both.

U.S. Pat. No. 5,944,776 describes one possible approach to eliminating the need for a full adder; by using a multiplicity of interconnected logic cells that produces a Booth output that is the Booth encoded form of the sum of a sum row and a carry row. This technique is not easily adaptable to wide width operands. Furthermore the technique described by this patent is more applicable to iterative multiplication algorithms used in a multiplicative divider.

In U.S. Pat. No. 5,724,280 a Booth multiplier using carry look ahead adders performs a multiplication operation in three stages: First the operands are loaded from a data bus, which takes a minimum of 8 clock cycles for a 256-bit operand and a 32 bit bus; second while loading the second operand, Booth encoding is begun 4-bits at a time and encoded values are accumulated, which takes 64 clock cycles; and third performing a final addition on 32-bit segments while outputting a result to the data bus, which requires 8 further clock cycles when using a 32-bit adder and a 32-bit data bus. Hence, a total number of 80 clock cycles are needed with a 32-bit data bus and a 32-bit adder. This circuit would thus be unacceptably slow when used with wider width operands.

It is possible to implement a high speed wide-width multiplier (256-bit by 256-bit) by using a number of 256-by-256 Booth multipliers which are pipelined to obtain the desired speed. But, such a circuit would be impractically large, particularly for implementation in an ASIC.

Furthermore, wide-width numbers can be processed by segmenting the operands and processing each of the segmented operands in a multiplier. The results from the processed segments are combined to obtain a final result. A problem associated with this technique is that carries generated while processing each segment have to be properly processed in order to obtain the correct final result, thus placing a constraint on the adder circuit, used to combine the results.

It is thus desirable to have a multiplier circuit using Booth encoding that performs wide width number multiplication in relatively few clock cycles and which occupies minimal chip area. Furthermore it is also desirable to have a more efficient adder circuit for processing the final result from the Booth encoder and which manages the carries generated in the Booth multiplier.

SUMMARY OF THE INVENTION

In accordance with this invention there is described a multiplier for computing a final product of a first operand and a second operand comprising:

(a) a multiplier array for forming a product of the first operand and second operand in carry-save form;

(b) a carry-save adder for adding said carry-save partial products and an accumulatd sum to produce a carry and save values;

(c) a carry-lookahead adder for adding said carry and save values to produce a product value and a carry-out value;

(d) a general purpose adder for adding said carry-out and said product value to produce said final product.

BRIEF DESCRIPTION OF THE DRAWINGS

The invention will now be described in conjunction with the attached drawings in which:

FIG. 7(a) is a diagram of a multiply operation illustrating errors resulting from obvious implementation approaches;

FIG. 7(b) is a table showing the effect of simple sign extension;

FIG. 8 is a symbolic representation of a multiply operation for use in illustrating problems and potential solutions thereto;

FIG. 10(a) is an example showing sign extension applied to each SUM results from employing a path from flowchart in FIG. 9; and FIG. 10(b) is an example based on data shown in FIG. 7 showing sign extension applied to each SUM results from employing a path from flowchart in FIG. 9.

DETAILED DESCRIPTION OF THE INVENTION

Figure 1:
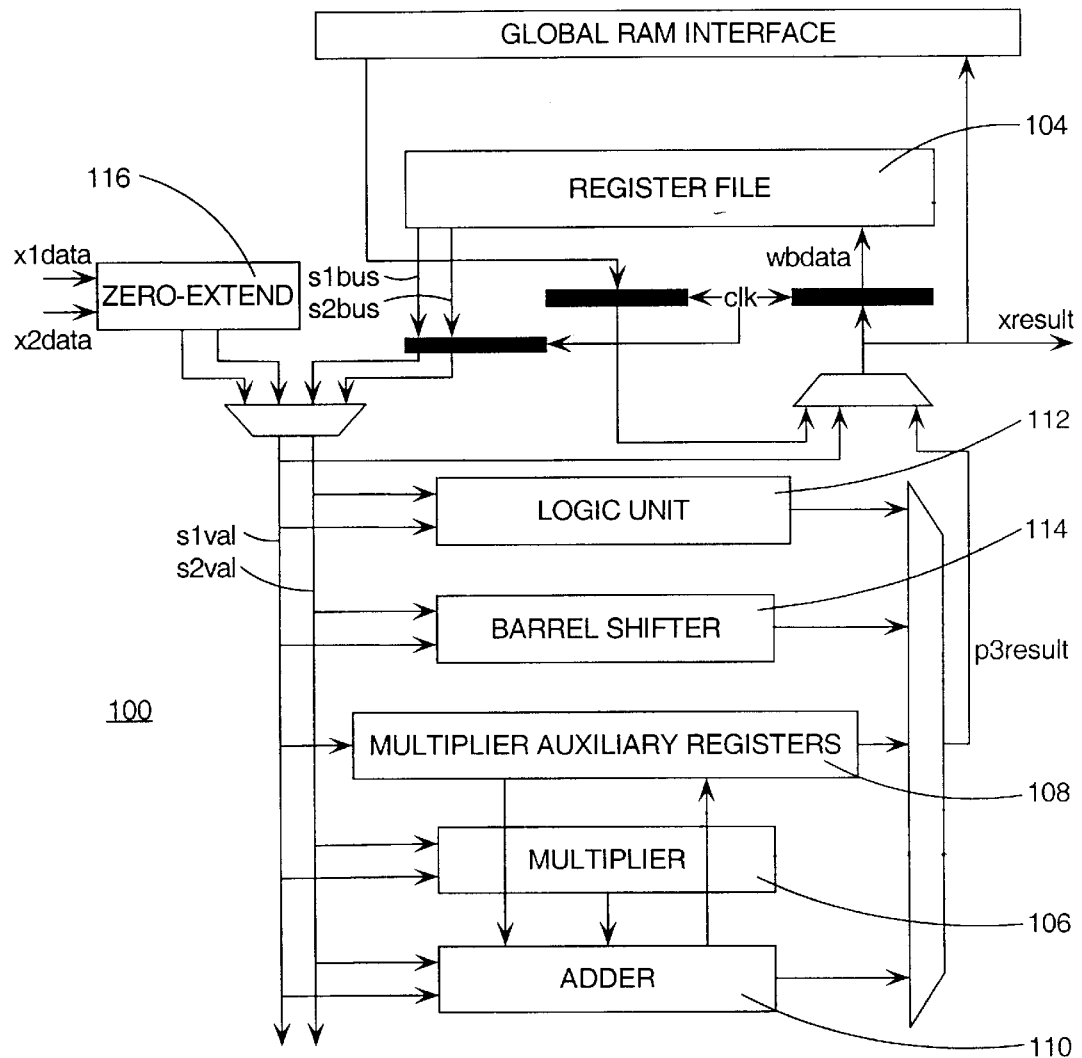
FIG. 1 is a block diagram of an arithmetic logic unit (ALU) incorporating a multiplier according to the invention.

In the following description, like numerals refer to like elements in the drawings.

Large numbers are frequently used, in many different applications, such as in cryptographic applications, and are typically in the order 1024 bits long or greater. Although a multiplier circuit of this size is possible theoretically, practically it is not feasible given today's technology. Therefore, a 1024×1024 multiply operation must be implemented using plural smaller multiplier circuits such as 256-bit multiplier. A method for multiplying large numbers, with a multiplier circuit that is capable of multiplying two 256-bit numbers is described as follows. Assuming one is to multiply two 1024-bit numbers. Each number is sub-divided into four successive 256-bit segments. Multiplication is performed on the segments using the fixed width multiplier circuit to form partial products of the segments. The partial products of the segments are then concatenated, and shifted versions of the partial products are accumulated to yield the final product of the two large numbers. The present invention provides a multiplier circuit and method for performing a wide multiplication of such numbers in a minimum number of clock cycles. For example a 256-by 256-bit multiply operation is performed in typically about 11 clock cycles.

Referring to FIG. 1, a block diagram of an arithmetic logic unit (ALU) incorporating a multiplier according to an embodiment of the present invention is shown generally by numeral 100. The ALU includes a pair of 256-bit internal data paths (s1 val, s2val) for carrying data and information between its various components and a control CPU (not shown). The components of the ALU include a 256-bit register file 104 for holding operands and results from computations, a 256-by-256-bit Booth multiplier 106 for performing wide-width multiplication, an auxiliary register 108 for holding the intermediate results of the multiplication, and a general-purpose adder 110 for processing an output from the Booth multiplier with intermediate output results stored in the auxiliary register to produce a final output result which is written into the register file 104 or an intermediate result which may be written back into the auxiliary register 108. The general-purpose adder 110 is also coupled to the data path to perform addition or subtraction on operands received directly along the data path. A zero-extend block 116 is also provided to prepend zero's to 32-bit data or instructions to 256 bits.

It may be noted that the operation of the ALU is generally controlled by the control CPU and data is transferred between the ALU and global RAM under control of the CPU. Further as shown in FIG. 1, the ALU includes a logic unit 112 and a barrel shifter 114, however these components are well known to those skilled in the art and not involved in the multiplication operation and therefore will not be discussed further.

Each of the components of the ALU 100 will be described in greater detail below, followed by a detailed description of their operation.

The auxiliary register 108 comprises two 256-bit product registers PLO for storing the least significant 256 bits, PHI for storing the most significant 256 bits and an 8-bit product overflow register (POV). A 256-bit path carries data between the auxiliary register 108 and the general-purpose adder 110. In addition, the auxiliary registers are coupled to receive data from the data path.

The register file 104 consists of sixteen 256-bit registers. Each register has two read ports and one write port.

Figure 2:
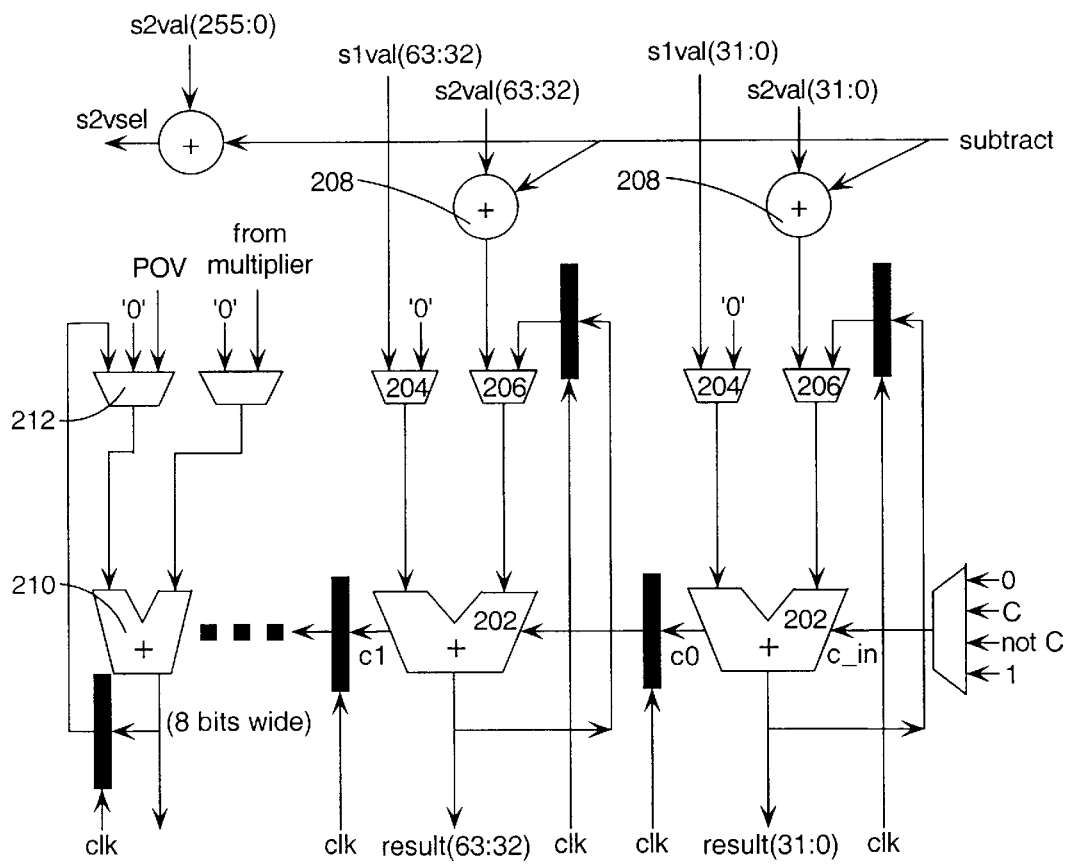
FIG. 2 is a block diagram of a general-purpose adder according to the present invention.

Referring to FIG. 2 there is shown a block diagram of the general-purpose adder 110. The adder 110 is a re-circulating adder, also known as an iterative adder, and is comprised of eight 32-bit adders 202, for processing consecutive 32 bits from the 256-bit data path s1val, s2val to each produce a 32-bit result. These 32-bit adders are readily available and widely implemented. Thus the performance and area of these 32-bit adders are well known. A pair of multiplexors 204, 206 are coupled to each 32-bit adder 202. One of the pair of inputs to each multiplexor is coupled to the data path to receive the 32-bits from either s1val or s2val. The other of the input to the multiplexors is coupled via a clocked buffer to selectively receive the output from its corresponding 32-bit adder. Furthermore, the s2val signals are coupled via XOR gates 208 to the multiplexors 206, thus for subtraction the XOR gates 208 can be set to invert the s2val signals. A carry out signal c0, c1, . . . c6 from respective adders 202 is coupled to a carry-in input of its adjacent adder.

This adder 110 may be used as a general-purpose adder in the ALU. In order to add two values, each of the addends are split into eight 32-bit segments. Each segment is added in a corresponding 32-bit adder to produce eight 32-bit partial sums and eight carry outputs. If all but the leftmost carry output is zero then the addition is complete. The sum is formed by the concatenation of the eight partial sums, and the carry-out is the value of the leftmost carry bit. Otherwise, if carry outputs other than the leftmost carry are non-zero, then the partial sums are routed back into one input of the adder, while the other input of the adder is set to zero. The carry input of each of the adders is set to the state of the carry of its right-hand neighbour and the addition is continued.

In addition to the eight 32-bit adder segments, an 8-bit adder 210 is used to finish part of a multiplication operation performed in the multiplier. The 8-bit adder 210 also has its inputs coupled to respective multiplexors. One of the multiplexors 212 is coulped to the POV register, while the other multiplexor 214 has an input coupled to receive a carry out signal cout from the multiplier 106. The use of the general-purpose adder in multiplication will be explained in more detail later.

Figure 3:
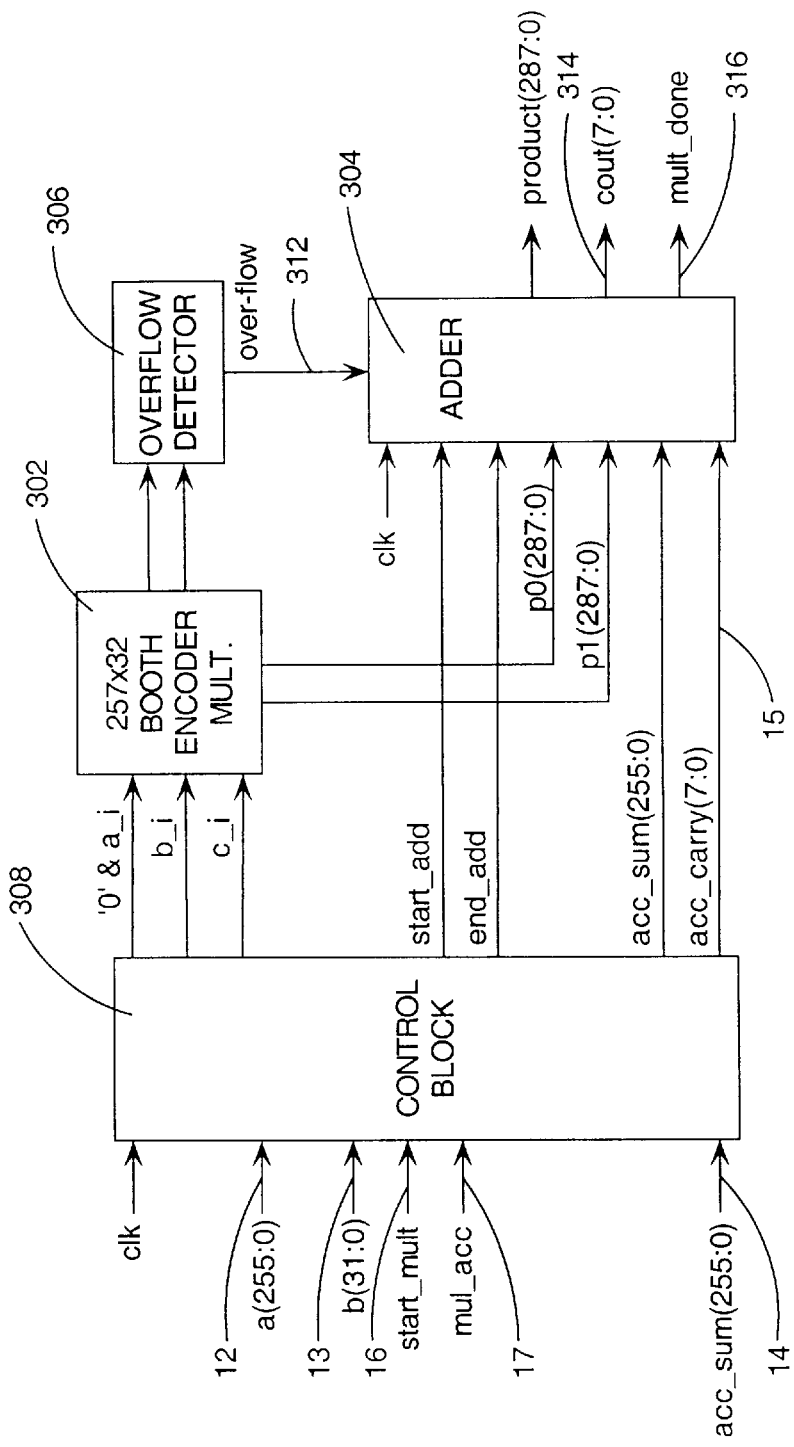
FIG. 3 is a block diagram of a multiplier according to an embodiment of the invention.

Referring to FIG. 3, a block diagram of the multiplier 106 is shown. The multiplier 106 performs 256×256-bit multiplication and comprises a well known 257×32-bit radix-4 Booth encoded Wallace tree array 302, an 8×32-bit carry-lookahead adder 304, an overflow detector 306 and a control block 308. In addition the multiplier 106 uses the auxiliary register 108 (comprised of the three aforementioned register segments PHI, PLO, POV) to store results during the multiplication and uses the general-purpose adder 110, shown in FIG. 2 to compute the final product in the multiplication operation to clear out any remaining carries.

Before continuing with a detailed description of the components of the multiplier, a brief high-level description of the algorithm used to perform the multiplication is provided as follows. This will serve to more clearly understand the interconnection of the various components within the multiplier 106.

The 257×32 multiplier array 302 is capable of generating a 288-bit partial product (256 plus 32) in two clock cycles. Thus for a 256×256 multiply, eight rounds of multiplication are run, using 32-bit segments of the multiplier, starting with the lowest order 32 bits. For a 256×32 multiply, the 32-bit multiplier is used directly, and only one round is required.

To illustrate the algorithm, consider the multiplication of two 8-digit decimal numbers and that an 8-digit×1-digit multiplier is available, The table below shows this operation. The table on the left shows a standard partial product method. The table on the right, shows the first four steps of the multiplication to illustrate the intent of the circuitry that makes up the multiplier. The multiplicand "31415926" is multiplied by the first digit of the multiplier "5" resulting in a partial product "157079630". Note that the partial products contains nine digits. In general, the partial product will contain the number of digits in the multiplicand plus the number of digits we are using in the multiplier. Also note that the least significant digit "0" is never added to anything. It can be shifted out to form part of the final product. The remaining digits of the partial product are shifted right one position and added to a second partial product. Again, the rightmost digit "5" of the resulting sum is not involved in any further computation, so it can be shifted out. The remaining digits are shifted right one position, and the process continues. After the eighth partial product has been produced, the final sum forms the leftmost digits of the final product.

| 31415926 | 157079630 → 0 |
| 83014375 | |
| 157079630 | 15707963 |
| 219911482 | 219911482 |
| 94247778 | 235619445 → 5 |
| 125663704 | |
| 31415926 | 23561944 |
| 00000000 | 94247778 |
| 94247778 | 117809722 → 2 |
| 251327408 | |
| 2607973461936250 | 11780972 |
| | 125663704 |
| | 137444676 → 6 |
| | etc. |

The multiplier uses a similar algorithm, except that instead of decimal digits; each fundamental unit is 32-bits. The multiplicand is 256-bit wide and the partial products are 288 bits wide.

Accordingly, refrring back to FIG. 3, the Booth multiplier array 302 takes in a 257-bit multiplicand and a 32-bit multiplier, and produces a 289-bit product in carry-save form two clock cycles later. (The purpose of the extra bit in the multiplicand and products will be explained later.) The output from the Booth multiplier 302 is two numbers that, when added together, forms the 289-bit partial product. The shifter unit 114 shifts the products left one bit if required. The shift operation's output is one bit wider than the input, so 290 bits are output from the shifter.

The two partial products p0 and p1 from the multiplier 302 are added to a third value acc_in to form a sum iacc which is latched in a register, since it is routed to acc_in for subsequent rounds. The addition is performed using a carry-save adder followed by a carry-look-ahead adder. The lower-order 32 bits of the sum are correct; they are written into the PLO register. The first set of 32 digits are written to PLO[31:0], the second set produced on the next round are written to PLO[63:32], and so on.

The adder 304 itself is similar to the 256-bit adder 110 described earlier, in that it consists of 32-bit full adders whose carries are latched and re-used on the next round. However, the interconnect is different. Since the partial sum must be shifted right 32 bits after each round, the carry bits are routed back to the input of the adders that produced them. This adder is described in more detail in FIG. 4. After all multiplier rounds have been performed, either one or eight 32-bit results have been produced and stored in the PLO register. The remaining bits of the final product are in iacc, however, the addition is not "complete" since there are partial carries still latched in the multiplier's adder. For a multiply-accumulate, the value in POV:PH1 still needs to be added in. This addition, along with resolution of the carries inside the partial sum iacc, is performed in the general purpose adder 110.

To reiterate some of the discussion above, referring back to FIG. 3, two operands inputs a(255:0) and b(31:0), along with control signals are applied to the control block. Though b is shown as having 32-bits, it could have the full 256-bits with segmentation performed in the control block. Alternatively another segment length such as 16 bits or 64 bits can be used. Preferably, the segment length is a power of two. An accumulated sum input acc_sum(255:0) is also provided to the control block for accumulation with a product. The control signals include a reset signal (reset), a start multiply signal (start_mult), a multiply accumulate signal (mul_acc) for distinguishing multiply accumulate operations from simple multiply operations, a clock signal (clk). The control block also provides control signals start_add, end_add to the adder 304. The control block 308 latches the operands and control signals and then schedules the whole multiplication process.

The 256×32-bit Booth encoder 302 receives the data from the control block 308 and generates two partial product values, P0(287:0) and P1(287:0).

The Overflow Detector block 307 is coupled to the Booth encoder 302 block to identify if any of P0 or P1 is a negative quantity and provide an over_flow signal 312 to the adder block 304 for determining the value with which to pad the highest order segment (as will be described later).

The adder 304 has partial product inputs (P0, P1); an accumulated sum input (acc_sum); and an accumulated carry input (acc_carry. The operation of which will be described in FIG. 4. The adder block 304 outputs a carry out value (cout) 314, and a signal indicating completion of the multiplication operation (mult_done) 316 and a product output product(287:0) 318.

Figure 6:
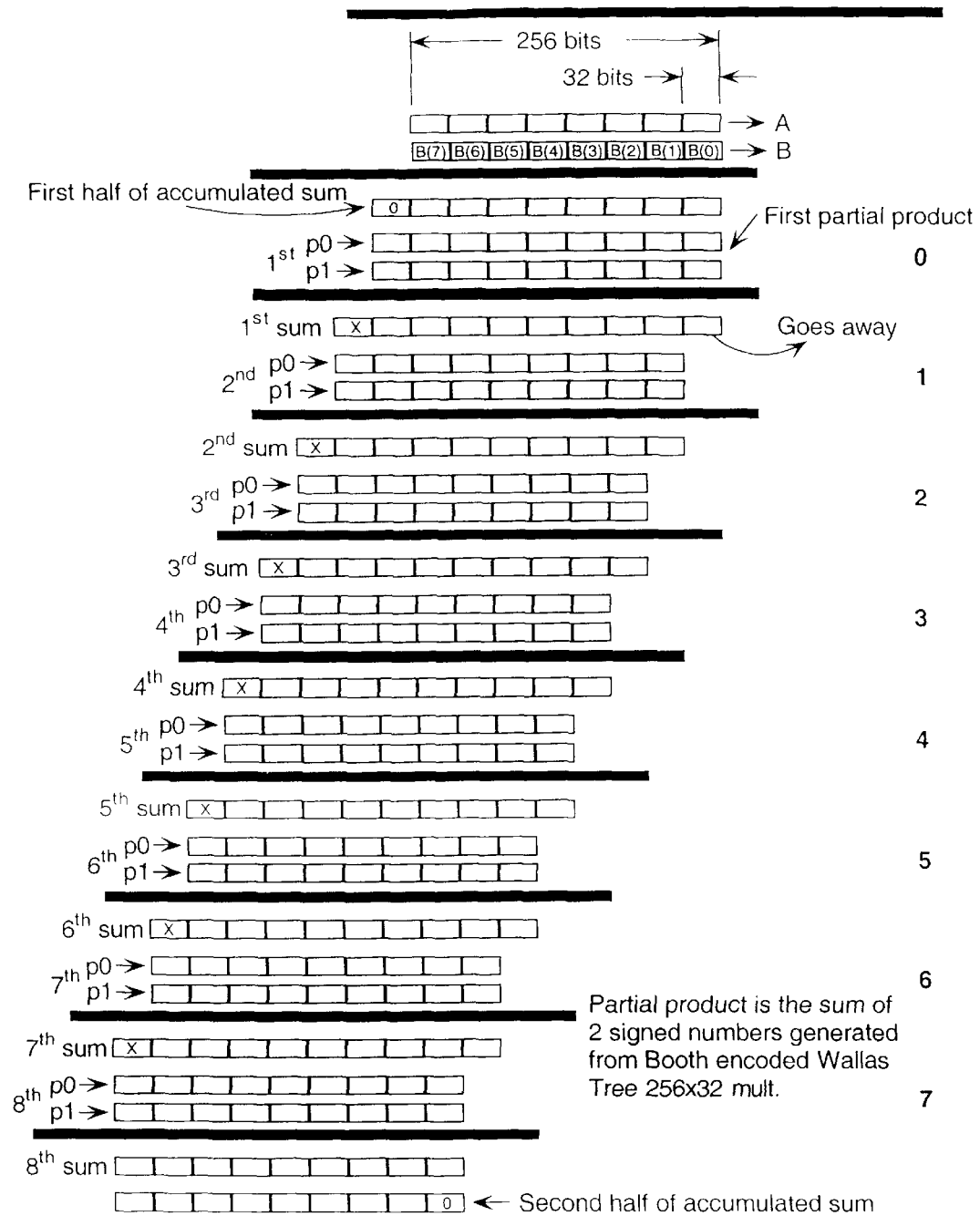
FIG. 6 is a schematic diagram illustrating the steps involved in performing Booth multiplication using iterative addition.

FIG. 6 illustrates conceptually the operation of the multiplication algorithm using Booth encoding with Wallace tree partial product reduction and iterative addition. The multiplier 106 receives two operands A and B, and generates the product of A and B product (287:0). For example, if both A and B are 256-bits wide, a single 256×256 Booth multiplier can be designed to meet a predetermined operating frequency. Unfortunately, such a circuit is impracticably large, requiring encoding of two 256-bit numbers into two 512-bit numbers. Hence, B is segmented into eight 32-bit chunks, B(0), B(1), . . . , B(7). A 256×32 Booth multiplier can be implemented in a practical amount of space, for example, for an ASIC. In order to perform the multiplication of the 256-bit multiplicands, the circuit performs A*B(0), A*B(1), . . . A*B(7) in the manner shown in FIG. 6. Multiplying A*B(0) using the Booth encoder generates $P0_0$ and $P1_0$ in two clock cycles due to pipelining. $P0_0$ and $P1_0$ are then added together along with the lower half of the previous multiplication result (contents of PLO), if the accumulate option is chosen, to generate a first sum—partial product. The accumulate option is chosen to add new product to previous resulting POV, PHI, PLO while multiplying two multiplicands and it is used to perform a larger multiplication (e.g. 1024×1024) which requires multiple smaller multiplication. The accumulate option is commonly used in conjunction with a multiply operation in order to more efficiently and rapidly generate results required by the control CPU, since often multiplication is combined with addition in various encryption algorithms.

After the first iteration generating the first sum 203, the lowest order segment (32 bits) of the first sum 203 is stored in PLO and is removed from the partial product. This 32-bit segment stored in PLO forms the lowest order segment (32 bits) of the final product (the least significant 32 bits of PLO). Then, the the first sum excluding the lowest order segment is shifted 32 bits to the right. This leaves an unfilled 32-bit segment at the very left (highest order 32 bits). Selecting how and with what to fill the contents of this left-most segment is one of The elements of the invention and will described in further detail below. As seen in FIG. 6, this first iteration of the process is repeated eight times and every time, the lower 32 bits are shifted into the next most significant 32 bits of PLO while the remaining bits of the current sum are right-shifted, extended with 32 left-most bits and accumulated with the previous accumulated sum. As seen in FIG. 6, for a 256×256-bit multiply operation with 32-bit segments, the process is repeated eight times to complete the multiply operations and resulted in forming PLO (8×32 bits). After The eight multiply operations, a partial product 204 the second half of the accumulated sum, is provided to the general purpose adder 1 where it is added to the upper half of the previous multiplication (PHI) 205 if the accumulate option is chosen and all carry values that are unresolved are resolved. The resulting 256 bits form the upper half of the product and are stored in PHI. If any carry out is generated from this last stage it is added to the original contents of POV and the result is stored back in the POV register.

Two obvious methods of adding segments include sign extending the highest order segment or padding the highest order segment with a same value, 0 or 1, consistently. Neither of these approaches however generates the correct final result of the operation. For example, a method of padding the highest order segment is presented below in order to illustrate the pitfalls in using this approach to achieve the final correct result. The padded values are represented by X in FIG. 6.

Figure 4:
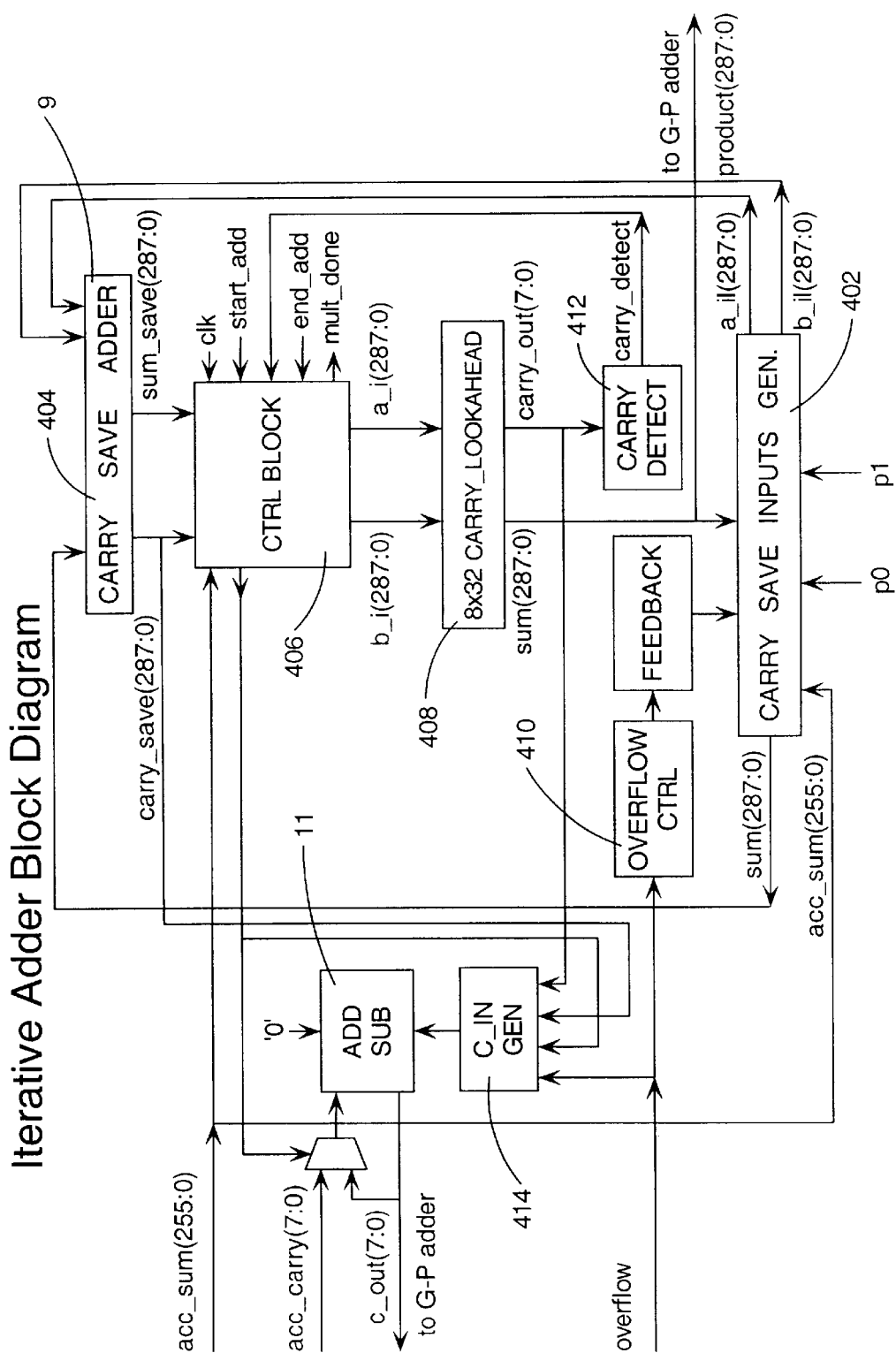
FIG. 4 is a block diagram of an Iterative Adder used in the multiplier of FIG. 3.

Referring to FIG. 4, a diagram of a 288-bit adder block 304 as used in the multiplier 106 is shown. The adder 304 is similar in structure to the general-purpose adder but is separate from the general purpose adder. The iterative adder within the multiplier is used in each iteration to add the previous accumulated sum with the right-shifted, left-segment-extended current sum to yield a new current sum In addition, the iterative adder differs from the general-purpose adder in that it must shift its output (including carry) right by 32-bits after each addition and because the iterative adder will be exercised eight times during a multiplication there is no need to test the carries and perform another round if any carries are set. Rather, eight iterations (for a 256×256 multiply) are always performed and after the completion of these eight iterations the general purpose adder is used to clear the carries. Accordingly, the iterative adder 304 includes a carry-save input generator 402, carry-save adders for performing compression 404, a control block 406, a carry look-ahead adder formed by eight 32-bit adders 408, an overflow control 410, a carry detector 412 and a carry-in generator 414. As shown inputs P0 and P1 are provided directly to the Carry Save Inputs Generator block 402. This block 402 is responsible for shifting a recycled sum and generating appropriate input values for addition by the Adder. As shown in FIG. 6, during every clock cycle once a multiplication operation is started, three quantities are added P0, P1, and the accumulated sum (a previous product shifted right 32-bits and padded appropriately). Since the Iterative Adder can operate on only two operands at a time, a Carry Save adder circuit is used to compress the number of inputs from three to two—from an accumulate value, recycled sum, a_il and b_il to carry_save(287:0) and sum_save(287:0). Hence, at each clock edge the Iterative Adder takes in a_i(287:0) and b_(287:0), and generates sum(287:0) and carry_out(7:0). The least significant 32-bits of this sum constitute 32-bits of the final product. The remaining 256-bits are extended with 0's or 1's depending on the decision of the Overflow Control block 410 as described below.

A control block controls the addition process including evaluating resulting carry out bits detected by a carry detect block. The summation also produces carry values generated during the iterative addition process that remain unresolved. The Add Sub block is initialised by the POV register according to multiply option selected to account for any carry generation during the multiplication process.

Figure 5:
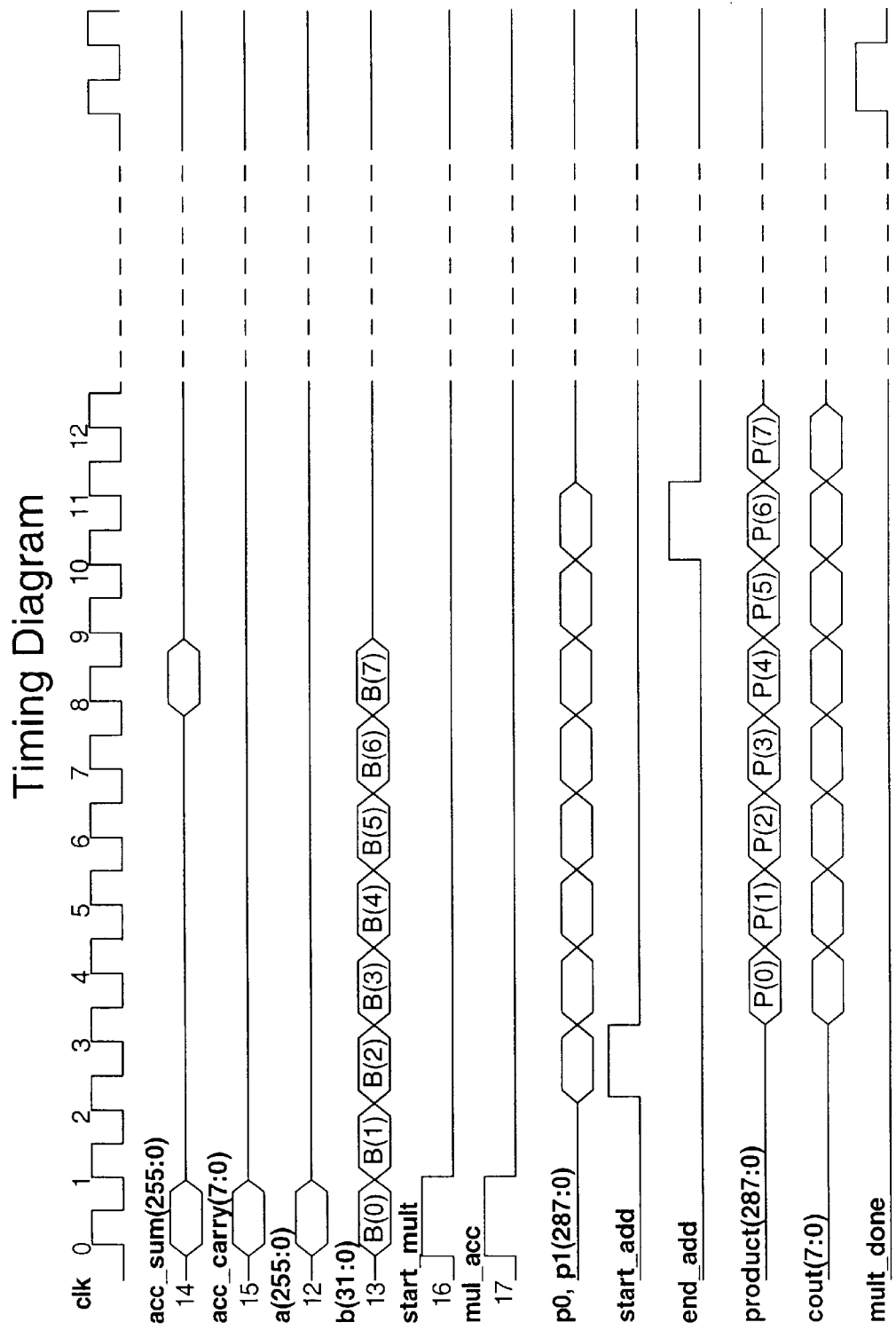
FIG. 5 is a timing diagram for the multiplier of FIG. 3.

Referring to FIG. 5 a waveform of the multiplication process is shown. The input signals a, b, acc_sum, and acc_carry are already setup when the control signal start_mult goes high indicating the beginning of a multiplication operation. The signal mul_acc indicates that the accumulate option is selected. The first partial product part P0, P1 is available two clocks after the start_mult signal is asserted. This is due to pipelining inside the implemented Wallace Tree. The number of cycles may vary depending on a number of pipelines, technology, and a clock frequency.

Eight P0, P1 pairs are generated from eight multiplications cycles $B_0$ . . . $B_7$, each of which result in an intermediate accumulated sum. The least significant 32-bits of these eight accumulated sums are concatenated to form the lower order 256-bits of the final product, which is stored in PLO. Therefore PLO is completely calculated after thirteen clock edges. The multiplication circuit is ready to commence another multiplication process at that point.

The remaining 256-bits of the final accumulated sum along with cout(7;0) are provided as an input value to the general purpose adder where carry values are resolved. Resolving of Carry values takes anywhere from 1 to 8 clock cycles when performed serially. Typically, resolving of carry values requires less than 3 clock cycles. The use of logic to reduce this length of time is also possible as described, for example, in U.S. Pat. No. 5,838,602 in the name of Feiller et al and issued Nov. 17, 1998 and incorporated herein by reference.

The general principles of operation of the multiplier may be better understood by referring to the following discussion. One of the problems of combining Booth Encoding and iterative addition is that iterative addition does not finish the addition in one step, while Booth encoding outputs two quantities whose fill sum makes the right product. Because the result is 512-bits but only 288-bits are processed at any one time, the remaining bits of the partial product or sum are not known. Of course when these are known, performance is substantially affected since the addition is a larger more complex operation. If a single Booth encoding step was performed and the sum completed, the problem would be avoided since simple sign extension of the proper partial product would suffice. However, when using iterative addition, the partial product comprises a partial product and carry bit values which may or may not be resolved at any stage. Since the Booth encoding sometimes produces values that though positive appear negative, simple sign extension does not suffice. Further, resolving all carry values at each stage, reduces the efficiency of the multiplier.

For example, Booth encoding multiplication produces from two multiplicands, A and B, two quantities P0, P1 whose sum is the desired product of the multiplicands, A*B. The problem arises because one of P0 or P1 might be negative. For example if A=B=0 then the output from the Booth encoder might be depending on the configuration

P0="1111 1111 1000"
P1="0000 0000 1000"

It is true that P0+P1=0, if the addition is resolved in one step and the carry out bit is ignored since the result is known to include only 12 bits (assumed). This exemplifies the problem associated with the Iterative Adder. The Iterative Adder doesn't perform the whole addition in one step; it truncates the operands and adds up the corespondent chunks in smaller adders resulting in several carry outs which are resolved during subsequent iterations. If any of the smaller adders generates a carry out value, the sum is recycled to one input of the smaller adder segment while the other input is reset to all 0's, then the carry out of each smaller adder segment is passed on as the carry in value of the next smaller adder segment, as shown in FIG. 6. Using the above example of P0 and P1 and assuming 4-bit adders are used to add the 12-bit quantities P0 and P1, the addition requires three clock cycles to perform the following:

| 1111 | 1111 | 1000 | P0 |
| 0000 | 0000 | 1000 | P1 |
| 1111 | 1111 | 0000 | Sum |
|      |      | 1    | Carry outs |
| 1111 | 0000 | 0000 | Sum |
|      | 1    |      | Carry outs |
| 0000 | 0000 | 0000 | Sum |
| 1    |      |      | Carry outs |

As is evident, by discarding the final carry out, the correct result is achieved.

As seen above the Iterative Adder receives only two operands at a time. On the other hand as shown in FIG. 6, three quantities are added at every clock edge for the multiplier. Therefore, a well known carry save technique is used to compress the number of operands from three to two. It works as follows:

| | 1111 | 1111 | 1111 | A | |
| | 1111 | 1110 | 0000 | B | |
| | 1110 | 0000 | 0000 | C | |
| | 1110 | 0001 | 1111 | Sum | CarrySave Stage |
| 1 | 1111 | 1100 | 000  | Carry | |
| | 1111 | 1101 | 1111 | | Iterative Adder Stage |
| 1 | | | | | |

In the example described herein if three 288-bit quantities are added together, the carry save stage consists of 288 one-bit full adders. These full adders will take A, B, and C as inputs and will output 288-bit sum and 288-bit carry signals. The carry signals get shifted one-bit to the left generating a carry out that is herein referred to as a carry save carry out (CS carry). Now only the sum and carry quantities require addition and these are provided to the Iterative adder which generates a further carry out value that is referred to as the iterative adder carry out (IA carry) (illustrated in FIG. 4 as the carry_out(7:0) signal from the iterative adder provided to the carry detect block).

As seen from the above example, the carry save stage generates a carry out which gets moved to the next segment before going to the iterative adder. Hence if this CS carry gets generated from segment number nine (the last segment in 256×256 multiplier for this example) a carry out value may be lost resulting in an incorrect product. Therefore, management of carry out signals is essential to providing a correct result.

As stated earlier the main problem encountered in combining Booth encoding and iterative addition techniques is that iterative addition does not resolve addition in one clock cycle while Booth encoding produces two quantities whose full sum makes up the correct product and whose values are not necessarily related to the input values in a readily apparent fashion. FIG. 7 shows one of the side effects of this problem. From FIG. 7(a), if 0P0 701 and 0P1 702 are the encoded values of one of the stages for a Booth encoder multiplier, then using a 4-bit per segment iterative adder to add them up will lead to SUM0 703. Now SUM0 703 is not the final sum for 0P0 701 and 0P1 702 since the carry out 708 from segment number 3 still has to go to segment number 4 making segment number 4 all zeros and therefore resolving the carry values. However, if there was another Booth encoded value 1P0 704, 1P1 705 for summation at a next clock cycle, then going through the carry save stage and again through the iterative adder with SUM0 703 extended with 0's will lead to SUM1 706. FIG. 7(b) shows the correct result of adding 0P0 701, 0P1 702, 1P0 704, and 1P1 705. Evidently, there is only one incorrect bit 709 within the final sum 707.

It has now been found that this bit 709 resulted from a carry out bit 708 that was generated from segment number 3 during the addition of 0P0 701 and 0P1 702, that was supposed to find its way out of the final sum 707, was not able to propagate out through the last segment since 0's were appended to SUM0 703 and therefore remains unresolved.

Alternatively, the value of the sum could be sign extended (which here incidentally results in a correct value). However, the following is an example where sign extension fails to lead to a correct result:

```
0000 1111 1110 0000 0000      1111 1110 0000 0000
0000 0000 0001 0000 0011      0000 0001 0000 0011
0000 0000 0000 0000 0000
0000 0000 0000 0000 0000      1111 1111 1111 0000 0011      SUM0
                              0000 0000 0000 0000
0000 1111 1111 0000 0011      0000 0000 0000 0000
                              1111 1111 1111 0000            Sum
                              0000 0000 0000 0000            Carry
                              1111 1111 1111 0000 0011      SUM1
```

As seen from the above example, sign extending SUM0 may also lead to an incorrect final result.

Another problem associated with using Booth encoding and iterative addition is that Booth encoding sometimes generates "false" carries. "False" carries are generated due to the presence of negative numbers and are not supposed to contribute to the final product (for example, see FIG. 7). On the other hand, "real" carry values are generated when the accumulate option is enabled so ignoring carries altogether is not an option. Those "real" carry values (one carry out by one full multiplication process) need to be added to the initial value of POV at the carry out resolution stage after the multiply operations are completed and the partial product is provided to the general purpose adder 1. Therefore, at the iterative adder stage, it is important to distinguish or to have distinguished between "false" carry values and "real" carry values.

Therefore, in summary, the following two problems are solved according to the invention: (1) determine the value with which to pad the shifted partial product; and (2) correctly manage all carry values generated during a multiplication process.

The problems outlined above are easily identified in some aspects and can be resolved based on a number of assumptions. First of all, the last segment of the Iterative Adder is the source of the first problem above since it has no neighbouring segment on to which to pass a CS carry value. Furthermore, when P0 and P1 of any encoded value are both positive, the last segment of the Iterative Adder either generates a CS carry value of 1 or an IA carry value of 1, but never both. This is because the last segment of P0 plus the last segment of P1 is not more than one segment long (each is less than half a segment's maximum value). Hence when these two values are added along with the value of the last segment of the previous partial product, the result is no more than one segment plus one bit (33 bits for a 32 bit segment). Hence no more than one carry out bit is generated from the last segment if both P0 and P1 are positive. And finally, both P0 and P1 are extensible to infinite number of bits such as

. . . 1111+1=. . . 0000+0.

Figure 8:
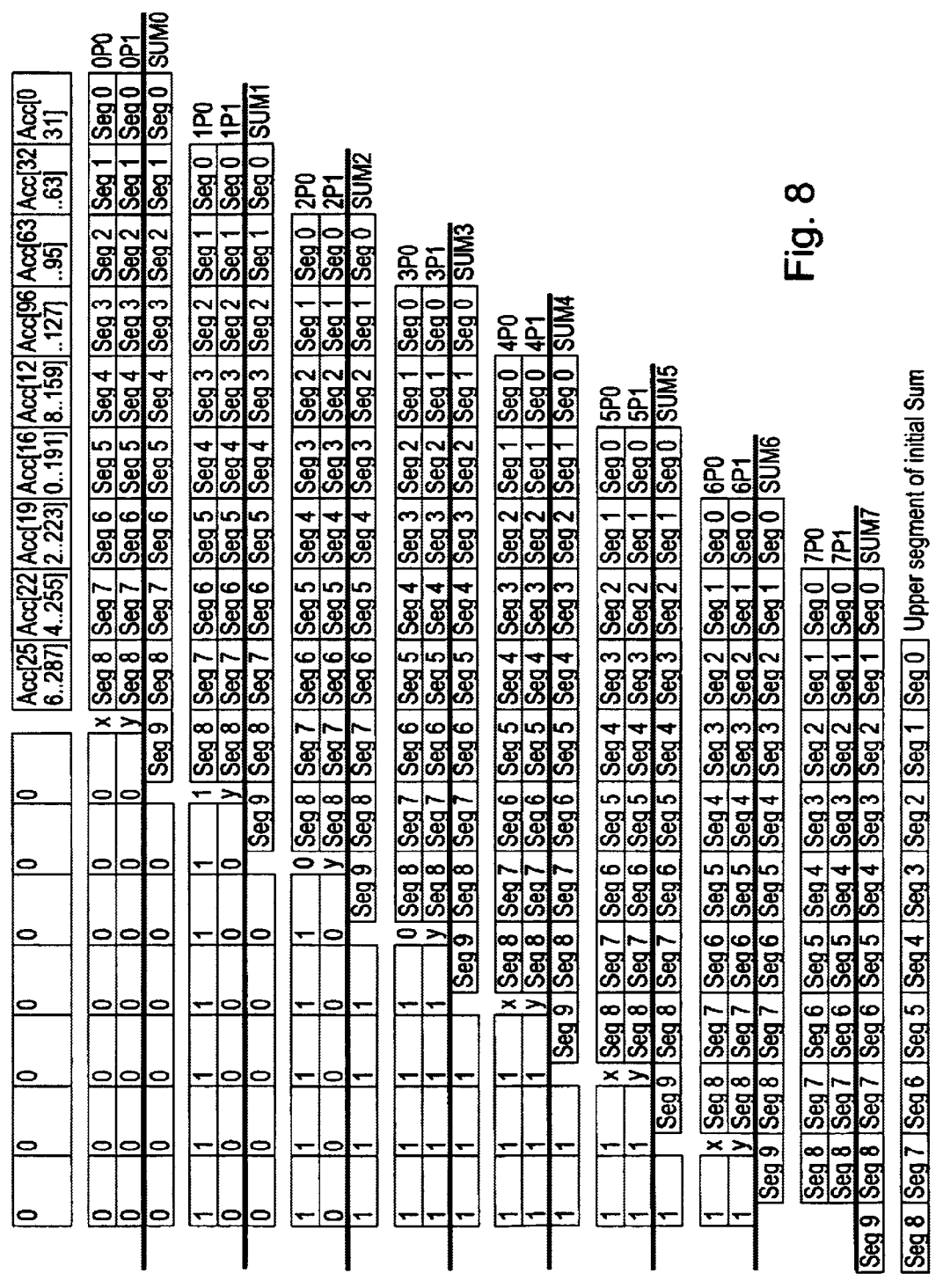

To solve the abovementioned problems, reference is made to FIG. 8, which is similar to FIG. 6 but with values hypothetically extended to a full resolution of 512 bits. From FIG. 8, each value is divided into two parts. physical (lower order segments to the right) 801 and virtual (higher order segments to the left) 802. The virtual part 802 is quite predictable since it is just an extension of the physical one; and hence it is either all 0's or all 1's. A 0 inside a virtual segment means the whole segment is made up of 0's and a 1 inside a virtual segment means the whole segment is made up of 1's. Now assume the first 256×32 multiplication generates 0P0 803 and 0P1 804, which are both positive quantities. Hence, all the virtual segments are easily filled with 0's. The symbol at the top left corner of the last segment of physical 0P0 805 in FIG. 8 represents the CS carry bit and has the value x for 0P0 meaning it could be 0 or 1. The symbol at the top left corner of the last segment of physical 0P1 806 represents the IA carry bit and has the value y, again meaning it could be 0 or 1. Taking the logical OR of CS and IA carries of 0P0 803 and 0P1 804 guarantees that no carry is lost since they can not both be 1 according to one of the assumptions identified above. Therefore, SUM0 807 is extended with the sum of the first two segments of the virtual parts of 0P0 and 0P1 and the extended segment will have the OR of CS and IA carries as an input carry.

Now assume 1P0 808 and 1P1 809 are the encoded values of the second 256×32 multiplication where 1P0 808 is negative and 1P1 809 is positive. In this case the virtual part of 1P0 810 is filled with 1's and the virtual part of 1P1 811 is filled with 0's. Since 1P0 808 is negative then the aspects above are less relevant and both resulting CS and IA carry bits may be equal to one; in which case taking their OR and feeding it to the next SUM results in a loss of one of the carry bit values. Further, only one of them is fed to the next SUM, for example the IA carry bit. However, the CS carry bit must still be dealt with. Again according to the noted aspects above, the virtual part of P0 and P1 is extensible to infinity. Hence, if CS carry bit is one then the rest of 1P0 is set to zeros and CS is zero—effectively ensuring that the CS carry bit was both generated and ignored. Therefore, the extension of SUM1 will have the sum of the first two segments of the virtual part of 1P0 and 1P1 where the virtual extension if 1P0 808 was all filled with zeros instead of ones.

In the case where both P0 and P1 are positive, the OR of CS and IA carry bits are provided as a carry in input for the extension segment of the next SUM in order to guarantee that no carry bit values were lost. Whereas when one of them is negative, only the IA carry bit is provided as an input carry in value in order to be able to ignore CS carry and switch the virtual extension to zeros.

Now, if 2P0 812 is negative again and 2P1 813 is positive but with the resulting CS carry bit of zero, there is no CS carry bit value to ignore. Hence, the filling of the virtual segments of 2P0 814 is with ones. Hence, similarly, SUM2 815 is extended with the sum of the first two segments of the virtual part of 2P0 and 2P1. In this case, since 2P0 812 is negative, and since Booth encoding has generated a false carry out that was not resolved (propagated out to CS carry), there is a carry value propagating inside SUM2 815 that requires resolution through all successive SUM's. At the end of the operation, the carry value will be resolved from the final product if the determined final product is correct. Therefore, this carry value is accounted for by decrementing the initial value of POV such that when this carry is finally resolved it offsets the negative one value that was added to POV, resulting in an accurate product.

SUM2 815 was extended with 1's. If the next 256×32 multiplication generates 3P0 816 and 3P1 817, wherein 3P0 816 is negative, it is guaranteed that a CS carry value of 1 is generated from the last segment when summed. The reason is the last bit in SUM2 is one and the last bit in the last physical segment of 3P0 has to be one since it is negative. Hence regardless of the value of the last bit in the last physical segment of 3P1 the Carry Save stage generates a CS carry value of 1, and a same process as that applied to 1P0 808 and 1P1 809 is applied. This guarantees that the extension of SUM3 is 1's and also guarantees that no false caries are initiated at this stage and hence no further decrements are made to POV. Now if 4P0 819 and 4P1 820 are the encoded values generated from the next 256×32 multiplication, and if they are both positive then they are dealt with similarly to 0P0 803 and 0P1 804. This results in an extension of SUM4 of all 1's due to the fact that the first virtual segment of SUM3 is 1's and the first virtual segment of 4P0 and 4P1 are both 0's.

Note the following:

Begin with the lower half of the initial sum and make its virtual extension all 0's.

As long as P0 and P1 are both positive or one of them is negative but a CS carry of one is generated then the next SUM is extended according to the first virtual segment of the previous SUM, and that is all 0's.

When a negative P0 or P1 occurs and the CS carry bit is not set (the carry value is not resolved) then the next SUM is extended with 1's and the content of POV is decremented by one.

After the first negative P0 or P1 is detected, it is guaranteed that the CS carry bit will be set every time a negative P0 or P1 is generated. Hence POV need not be decremented and all subsequent SUM's will be extended according to the first virtual segment of the previous SUM—all 1's.

After the last multiplication and when SUM7 821 is available, SUM7 821 along with the upper half of the initial sum 822 is provided to the general purpose Adder 1 in order to complete the addition and resolve any outstanding carries. In this stage, any carry out generated from the last physical segment of the SUM is used to increment POV by one.

Figure 9:
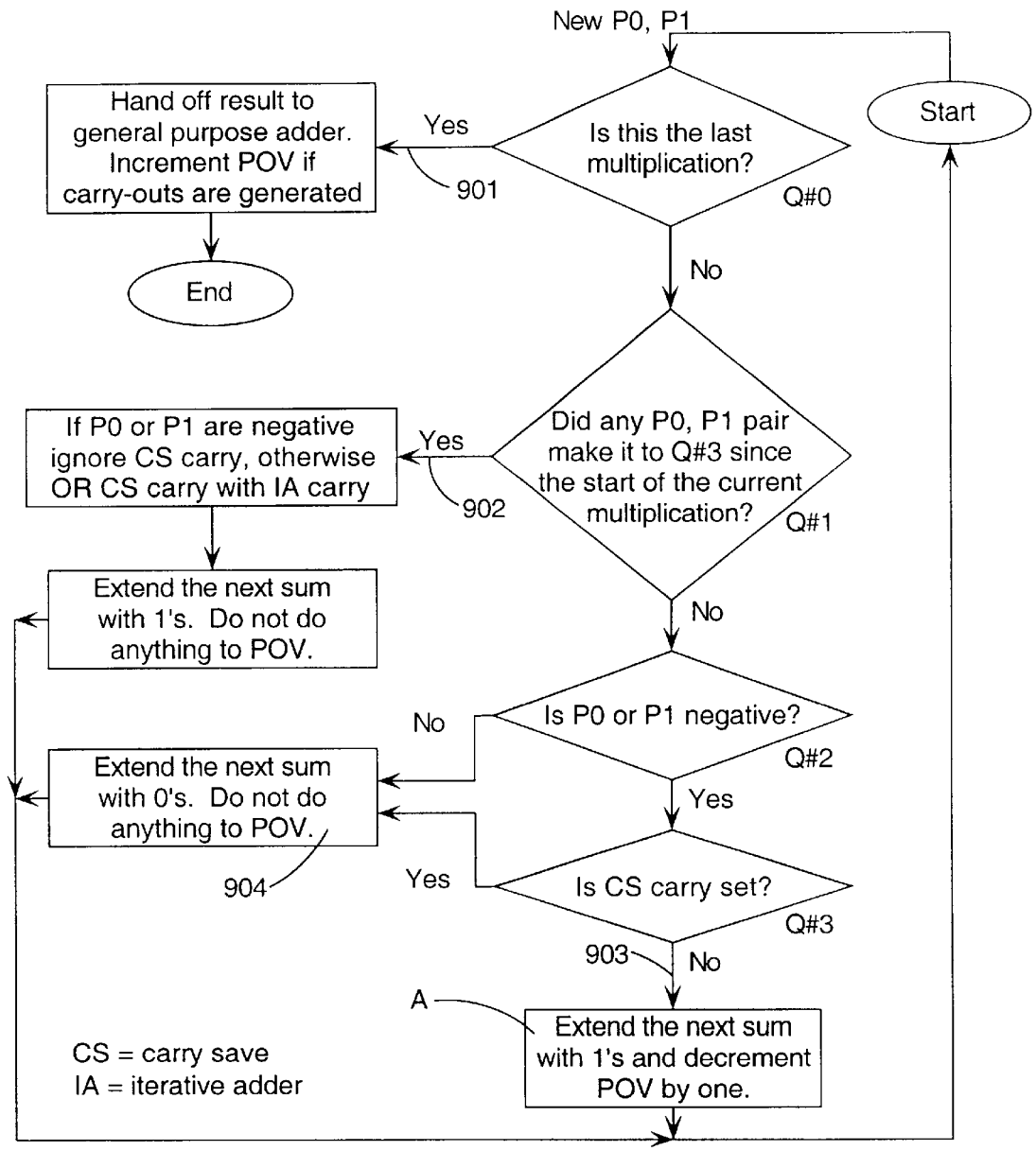
FIG. 9 is a flow diagram showing sign extension as applied in the multiplier of the present invention.

The simplified flow diagram of FIG. 9 shows a method of performing multiplication according to the invention. An encoded value of P0 and P1 is received. Sum these values to form a partial product. Store the resulting lowest order segment in PLO. Shift the partial product right one segment. When these values are a final segment 901, the multiplication is complete and the partial product and carry values are passed onto the general purpose adder 1. Otherwise, when the sign extension flag is set 902, extend the value of the partial product with 1s. When the sign extension flag is not set, then when both P0 or P1 is negative and CS carry is not set, 903, set the flag bit extend the value of the partial product with 1s, and decrement POV by one. Otherwise, extend the value of the partial product with 0s. Repeat the steps for a next pair of P0 and P1.

Though the invention is described with reference to segments of 32 bits, this is an arbitrary segment length. Segments are implemented in lengths based on adder width, multiplier implementation and so forth. As such, depending on architecture, segments are of any desired length.

Though the invention is described with reference to ones and zeros, the invention is equally applicable to opposite polarity where ones are zeros and zeros are ones with appropriate modifications as necessary. These are mere design decisions and do not substantially effect operation of the invention.

Although the above embodiment is described for implementing a 256 bit×256 bit multiply operation, the invention is applicable to larger or smaller numbers. For example a 1024 bit×1024 bit multiply operation performed according to the above embodiment requires a Booth Encoder with Wallace Tree multiplier for handling 1056 bits, which is substantially smaller than a 2048 bit Booth Encoder with Wallace Tree multiplier. When such is the case, the method and circuit is similar to that described above except that it is larger to handle a wider number. In such an example PHI and PLO are each 1024 bits wide, the multiplier performs 1056 bit Booth encoding and shifts the lowest order segment (32 bits) into PLO. The remaining segments are shifted right in accordance with the invention and the result is then provided to the next iterative Booth encoding and accumulation stage. Of course, such an embodiment works with segment sizes other than 32 bits.

Alternatively, the two 1024 bit numbers can each be segmented into, for example 256 bit numbers. This results in sixteen (16) 256 bit wide multiply operations as is known in the prior art to implement a single multiply operation. This method is described in co-pending Canada Patent Application Serial Number 2,291,596, filed Nov. 30, 1999, entitled "Method and Circuit for Squaring Numbers," by Maher Amer. The use of such a method allows for a 1024 bit wide multiplication operation to be performed using a Booth Encoder with Wallace Tree multiplier supporting 288 bits. The preceding two embodiments highlight some of the design considerations in implementing the present invention. Of course with different segment sizes and different multiplicand sizes, the amount of processing and integrated circuit area varies accordingly.

Numerous other embodiments may be envisaged without departing from the spirit or scope of the invention.

What is claimed is:

1. A multiplier for computing a final product of a first operand and a second operand comprising:

(a) a multiplier array for forming partial products of the first operand and second operand in carry-save form;

(b) a carry-save adder for adding said carry-save partial products and an accumulatd sum to produce a carry and save values;

(c) a carry-lookahead adder for adding said carry and save values to produce a product value and a carry-out value;

(d) a general purpose adder for adding said carry-out and said product value to produce said final product.

* * * * *